June 13, 1950 C. F. BOOTON 2,511,457
FIXED CUTTER BLADE ADJUSTMENT FOR LAWN MOWERS
Filed June 22, 1945 2 Sheets-Sheet 1
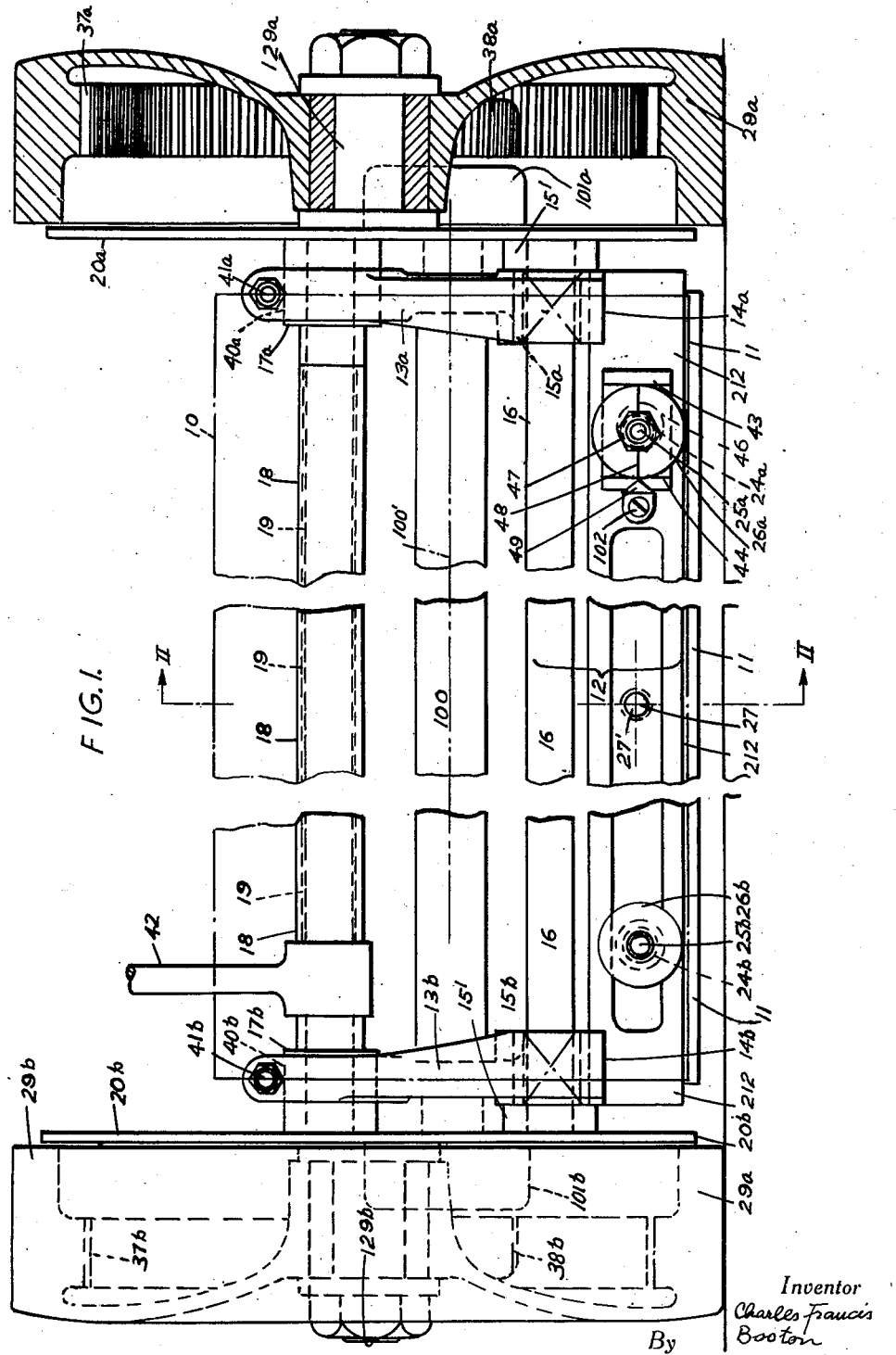
Inventor
Charles Francis Booton
By

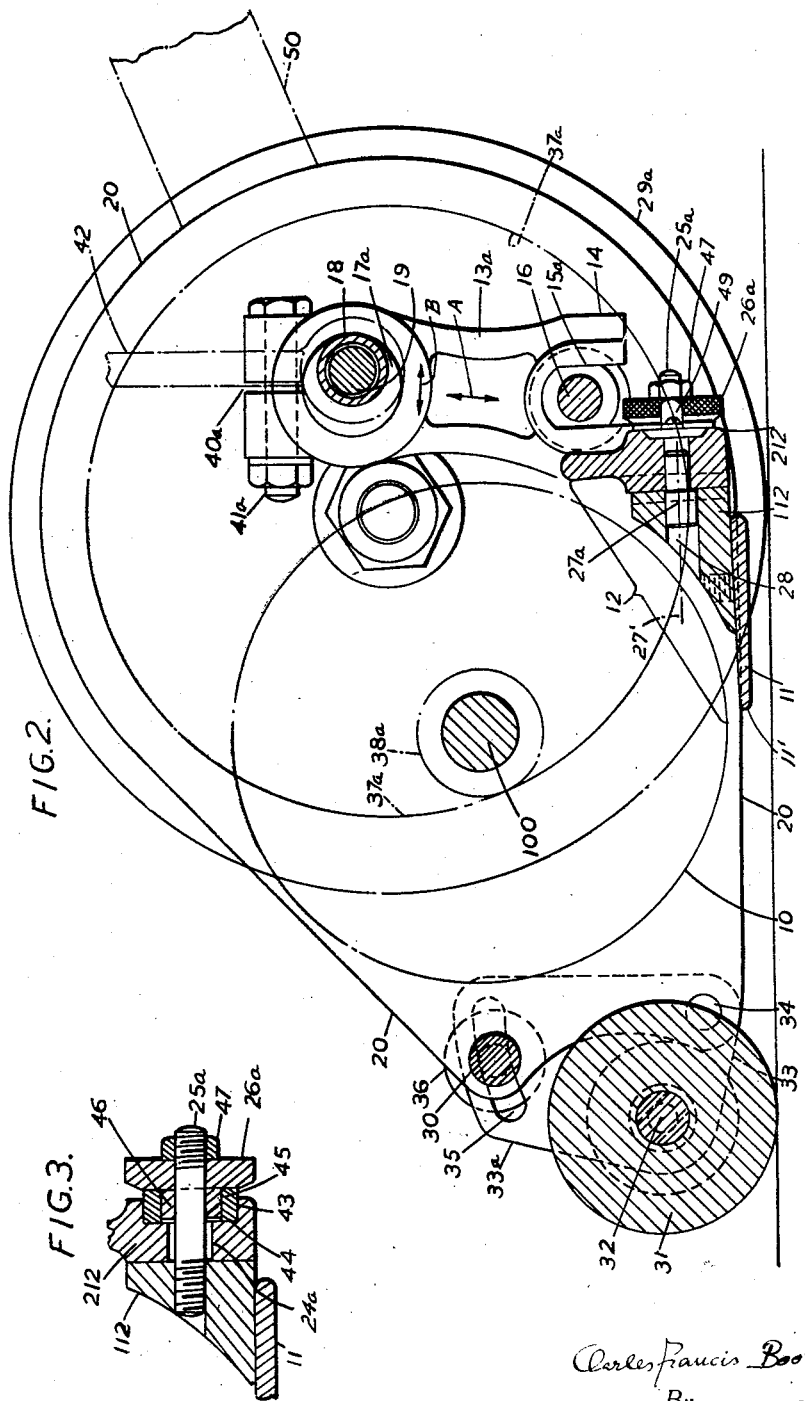

Patented June 13, 1950

2,511,457

UNITED STATES PATENT OFFICE 2,511,457

FIXED CUTTER BLADE ADJUSTMENT FOR LAWN MOWERS

Charles Francis Booton, Anstey, England, assignor to The J. P. Engineering Company Limited, Leicester, England Application June 22, 1945, Serial No. 600,912
In Great Britain January 2, 1945

9 Claims. (Cl. 56—289)

This invention is for improvements in and relating to lawnmowers and like mowing machines of the type comprising a rotary cutter and a stationary or non-rotatable blade (hereinafter termed the shear blade) co-operating therewith, and is applicable to hand-propelled machines, power-driven machines such as motor mowers, and to machines which, like gang mowers, are intended to be towed. In such machines it is desirable to provide for two kinds of adjustment of the shear blade in relation to the rotary cutter. It is desirable to provide means whereby the edge of the shear blade may be adjusted towards and away from the surface of revolution of the rotary cutter (i. e. the cylindrical path swept out by the outer periphery of the rotary cutter) so that the minute spacing between said edge and the surface of revolution is varied; this adjustment is for convenience hereinafter referred to as adjustment for spacing. Since the surface of revolution of the rotary cutter is not always perfectly parallel, particularly after the said cutter has been sharpened, it is also desirable to provide means whereby the edge of the shear blade and the surface of revolution may be brought parallel to one another; for convenience this adjustment is hereinafter referred to as adjustment for parallelism. The present invention is concerned with a construction whereby these two different kinds of adjustment may be readily effected and which is simple in manufacture.

Viewed from one aspect the invention provides a lawnmower or like mowing machine of the type specified, having the shear blade adjustable for spacing, and characterised by an adjusting device for adjusting the shear blade for parallelism about a fulcrum or pivot which is intermediate its ends and is normal to the axis of the rotary cutter or is tangential to a circle concentric with said axis, which device is spaced from the fulcrum or pivot and comprises a rotatably-adjustable eccentric interposed between the shear blade and a part to which it is fulcrumed or pivoted, a slider engaging the eccentric, and guides in which the slider is movable, upon rotation of the eccentric, towards and away from the pivot.

The invention further includes a lawnmower or like mowing machine of the type specified, having a shear blade assembly comprising two connected parts whereof one comprises the shear blade and the other is hinged or pivoted about an axis substantially parallel with that of the rotary cutter, a fulcrum or pivot between the two parts at a location intermediate the length of the shear blade and about which the shear blade is adjustable for parallelism, adjustment means for rocking the assembly about said parallel axis to effect the adjustment for spacing, and a rotatably-adjustable eccentric rotatable about an axis which is fixed in relation to one of the two connected parts of the shear blade assembly, at a location spaced from the fulcrum or pivot, a member engaging with this eccentric so as to be displaced thereby, and means connecting said member with the other part of the assembly in such manner as substantially to restrict its displacement in relation to the assembly to movement towards and away from the pivot.

These, and other features of the invention set out in the appended claims, are incorporated in the construction which will now be described in detail by way of example, with reference to the accompanying drawings in which:

Figure 1 is a rear elevation showing the relevant parts of the lawnmower;

Figure 2 is a cross section therethrough taken on the line II—II in Figure 1, and Figure 3 is detail section on a larger scale showing the aforesaid adjusting device.

In this construction the lawnmower has the usual rotary cutter of the helical blade type, indicated at 10 mounted for rotation about a substantially horizontal axis 10' extending transversely of the machine, and a shear blade 11 mounted in such manner that its forward edge 11' (which is the cutting edge) is substantially vertically below the said axis. This shear blade 11 is in the form of a thin plate which is incorporated in a shear blade assembly 12 comprising members 112, 212 adjustably secured together as hereinafter described. At each end, the member 212 has an upstanding lug 13a or 13b having a vertical fork 14a or 14b slidable on a flat-sided bush 15a or 15b rotatably mounted on a substantially horizontal cross-shaft 16 that forms a part of the machine frame. At the top, the lugs 13a or 13b encircle and house eccentrics 17a, 17b secured to a sleeve 18 that is rotatably mounted on another horizontal cross-shaft 19 also forming part of the machine frame. These cross-shafts 16, 19 extend between the side plates 20a, 20b of the frame, and the shear blade assembly 12 is located against movement transversely of the machine by the engagement of the lugs 13a, 13b between the flanged ends 15' of the bushes 15a, 15b that are themselves located by the side plates 20a, 20b.

It will be appreciated that by rotating the eccentrics 17a, 17b the spacing between the periphery of the rotary cutter 10 and the edge 11' of the shear blade 11 is adjusted. This adjustment is compounded of two movements (a) vertical movement of the shear blade assembly (i. e. sliding movement transversely of the cutter axis 100' as indicated by arrow A in Figure 2) and (b) rocking movement of the assembly about the lower cross-shaft 16 (i. e., about an axis 16' that is substantially parallel to that of the rotary cutter as indicated by arrow B in Figure 2). Obviously, the attitude of the eccentrics 17a, 17b determines the relative importance of those two movements. With the attitude shown, the vertical movement is the most important, but were the eccentrics shifted round 90° the rocking movement would become the most important.

According to a feature of the invention the top bosses of arms or lugs 13a, 13b, that encircle the eccentrics 17a, 17b on sleeve 18, are split at 40a, 40b and provided with clamping bolts 41a, 41b whereby they may be clamped with any degree of tightness around the eccentrics. The sleeve 18 is provided with a protuding handle 42 by which it and the eccentrics 17a, 17b may be rotated, and it is preferred that the degree of tightness shall be such that the eccentrics 17a, 17b may just be rotated by hand but will not rotate under vibration. This permits the adjustment for spacing to be effected very rapidly and further permits the shear blade 11 readily to be moved right away from the rotary cutter 10 when the machine is not in use or is being moved from place to place. A further advantage is that the adjustment is not likely to be disturbed if the shear blade strikes an obstruction.

The assembly 12 comprises front and rear parts 112, 212 respectively each of which may be constituted by a substantially rigid casting, forging or the like. The front part 112 has the shear blade 11 bolted to or formed integral with it while the rear part 212 is provided with the lugs 13a, 13b before mentioned. These two parts are pivoted together at the center of the length of the shear blade 11 so that the front part 112 may rock about a fore-and-aft axis 27' which is substantially horizontal and substantially tangential to the aforesaid surface of revolution. Near each end of the rear part 212 the latter is pierced by a slot or clearance hole 24a or 24b and through these slots or holes clamping bolts or studs 25a, 25b provided respectively with a nut or hand wheel 26a or 26b extend forwardly into the front part 112 of the assembly. These slots or clearance holes 24a, 24b permit of the adjustment for parallelism and by the bolts or studs 25a, 25b the front part 112 may be clamped in the adjusted position. The pivot conveniently consists of a dowel or stud 27 projecting from one part into a hole in the other part of the assembly 12, e. g. projecting forwardly from the rear part 212 into a suitable hole 28 in the front part 112. It may here be mentioned that although in the illustrated construction the axis 27' of said pivot 27 is tangential to a circle concentric with the axis 100' of the rotary cutter 10, yet it will be appreciated that the shear blade assembly may readily be so constructed that said fore-and-aft pivot axis is normal to the cutter axis.

At one of the locations where a clamping stud 25a or 25b and nut 26a or 26b is provided for securing the two parts 112 and 212 of the shear blade assembly 12 together in the desired attitude of adjustment (for parallelism) about the fulcrum or pivot 27, an eccentric adjusting device is provided. Assuming that the stud 25a under consideration is fixed in part 112, to extend through a clearance hole or slot 24a in the other part 212, a guide channel 43 is cut in the outer face of part 212 in which channel a slider 44 is guided for sliding movement towards and away from the pivot 27. This slider 44 has a bore 45 in which there is received an eccentric boss 46 on a hand wheel or knurled disc 26a journaled on the stud 25. Therefore by rotating the disc 26a the slider 44 is moved in its guide 43 and the part 112 is rocked in relation to part 212, about pivot 27, to provide the adjustment for parallelism. The disc 26a is restrained from accidental rotation by a hexagon or other clamping nut 47 on the stud.

It is desirable to provide a visual indicator or zero mark in order to facilitate setting or adjustment for parallelism. Conveniently there is an index on the part 212 and one on the knurled disc 26a, and with advantage there is a diametral line 48 on the face of the latter and the eccentric 46 in the slider 44 is so arranged (i. e., the throw being directed away from the axis of the pivot 27) that upon rotation of the disc 26a this line 48 moves about the axis of the stud 25 in the same sense (i. e., clockwise or anticlockwise) as the 112 moves about the pivot axis, a pointer or the like 49 being conveniently provided on part 212 being attached by screw 102.

This assembly is preferably applied to a lawnmower which is driven by side wheels 29a, 29b as contrasted with the kind of lawnmower which is driven by a roller. The frame of this lawnmower consists of two side plates 20a, 20b between which the rotary cutter 10 is mounted by cutter spindle 100; these side plates 20a, 20b are connected by the cross shafts 16, 19 aforesaid and by at least one other cross shaft (e. g. 30, Fig. 2). At the front the machine is supported by a small roller 31 which extends transversely of the machine on a suitable spindle 32. This roller 31 may be adjustable vertically so as to adjust the rotary cutter 11 above the ground surface, for which purpose the ends of the roller spindle 32 are secured to end plates or arms (of which a representative arm is indicated at 33a in Figure 2) pivoted to the side plates 20 at 34 and at least one such end plate or arm being provided with an arcuate slot 35 transfixed by the end of the top front cross shaft 30 of the frame, the said transfixing end of the shaft being screwed to receive a hand nut 36 whereby the end plate may be clamped in the desired position of adjustment.

Each side wheel 29a, 29b is supported on a stub axle 129a or 129b which projects outwardly from the adjacent side plate 20a or 20b, and is formed with an internal gear 37a, 37b with which a pinion 38a, 38b, mounted by means of a free wheel 101a or 101b on the adjacent end of the cutter spindle 100, engages. This free wheel may be of the ball or roller type, or of the pivoted pawl type.

The handle 50, by which a machine may be propelled, is attached to the side plates 20 of the frame.

The provision of a support roller 31 at the front of a lawnmower or the like driven by side wheels located at the rear of said roller has the advantage that it permits the mower to be used to mow a lawn right up to the edge, with one of the side wheels overhanging the edge and the other running on the grass and providing the drive to the cutter.

I claim:

1. A mowing machine of the type comprising a rotary cutter and a shear blade co-operating therewith, wherein the shear blade is adjustable for spacing and parallelism; having a part to which the shear blade is fulcrumed, a fulcrum intermediate the ends of the blade for pivoting it to said part for adjustment for parallelism, and a device, spaced from the fulcrum, for effecting the adjustment for parallelism, which device comprises a rotatably-adjustable eccentric interposed between the said part and shear blade, a slider engaging the eccentric, and guides for movement of the slider, towards and away from the fulcrum, upon rotation of the eccentric.

2. A mowing machine of the type comprising a rotary cutter and a shear blade co-operating therewith; having a shear blade assembly comprising two connected parts whereof one comprises the shear blade, means pivoting the second part about a pivotal axis substantially parallel with the axis of the cutter, a fulcrum between the two parts at a location intermediate the length of the shear blade and about which said blade is adjustable for parallelism, and a device for adjusting the blade, for parallelism about said fulcrum which device is spaced from the cutter and comprises an eccentric rotatable about an axis which is fixed, in relation to one of the two connected parts of the assembly, a member engaging this eccentric and displaceable thereby, and means connecting said member to the other part of the assembly and for restricting its displacement substantially to movement to and from the pivot.

3. A machine according to claim 2, wherein said member is a slider and the said means consists of guides for it on said other part.

4. A mowing machine of the type comprising a cutter rotating about a transverse horizontal axis and a stationary shear blade extending parallel to said axis; having in combination a mounting for the shear blade upon which it is adjustable about an axis parallel with the cutter axis, means mounting the shear blade on said mounting for rocking adjustment in relation thereto about a fore-and-aft axis that is intermediate its ends, and a device, spaced from the fore-and-aft axis, for producing the rocking adjustment comprising a rotatable eccentric and a member engaged and displaceable thereby both interposed between the shear blade and mounting, and means for causing the displacement of the said member by the eccentric to result in rocking of the shear blade by restricting said displacement substantially to movement towards and away from the fore-and-aft axis.

5. A machine according to claim 4, having the throw of the eccentric directed away from the fore-and-aft axis, and having a visual indicating line associated with the eccentric and movable, about the axis of the cutter, in the same sense as the shear blade moves about the fore-and-aft axis.

6. In a lawn mower or like mowing machine having a cutter rotatable about a transverse axis, a shear blade having an edge co-operating with the cutter in the lower regions of the cylindrical path swept out by the outer periphery of the rotary cutter, an adjustment for spacing whereby the shear blade edge is adjusted to or from said surface, and an adjustment for parallelism whereby the shear blade is tilted to bring its edge into parallelism with said surface; the combination of a shear blade assembly comprising two connected parts whereof one comprises the shear blade, eccentric adjustment means mounting the other part, and thereby the whole assembly, for displacement to effect the adjustment for spacing, means pivoting the first-mentioned part of the assembly to the other part for rocking adjustment for parallelism about an adjustment axis lying in a vertical plane that is normal to the cutter axis, and an eccentric adjustment device remote from said adjustment axis for producing the rocking movement.

7. A machine according to claim 6, wherein the eccentric adjustment device comprises a clearance hole in said other part, a pin projecting therethrough from the first part, an eccentric rotatably mounted on said pin, a slider received on the eccentric, and guides mounting the slider on said other part for movement to and from the adjustment axis.

8. A machine according to claim 6, wherein the eccentric adjustment means for spacing comprises eccentrics adjustable about an axis parallel to the surface of revolution, a handle for adjusting them, split housings, on the other said part of the assembly, embracing the eccentrics, and screw means for clamping the housings round the eccentrics.

9. A machine according to claim 6, wherein the eccentric adjustment means for spacing comprises an eccentric rotatably adjustable about an axis substantially parallel to that of the cutter, a housing for the eccentric connected to said other part of the assembly, and guides for rocking movement of said assembly about, and for sliding movement of said assembly transversely of, a further axis that is substantially parallel to the cutter axis.

CHARLES FRANCIS BOOTON.

REFERENCES CITED

The following references are of record in the file of this patent:

UNITED STATES PATENTS

| Number | Name | Date |
| --- | --- | --- |
| 726,786 | Tunny | Apr. 28, 1902 |
| 1,093,283 | McGuire | Apr. 14, 1914 |
| 1,742,903 | Eustice | Jan. 7, 1930 |
| 1,757,186 | Gratiot | May 6, 1930 |
| 1,836,386 | Nichols et al. | Dec. 15, 1931 |
| 2,167,130 | Vondracek | July 25, 1939 |